Oct. 27, 1959     E. R. CHRISTMAS     2,909,859
DECOY DEVICE
Filed Jan. 23, 1959
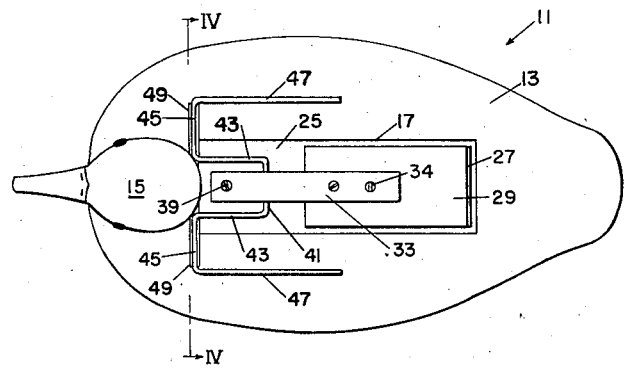
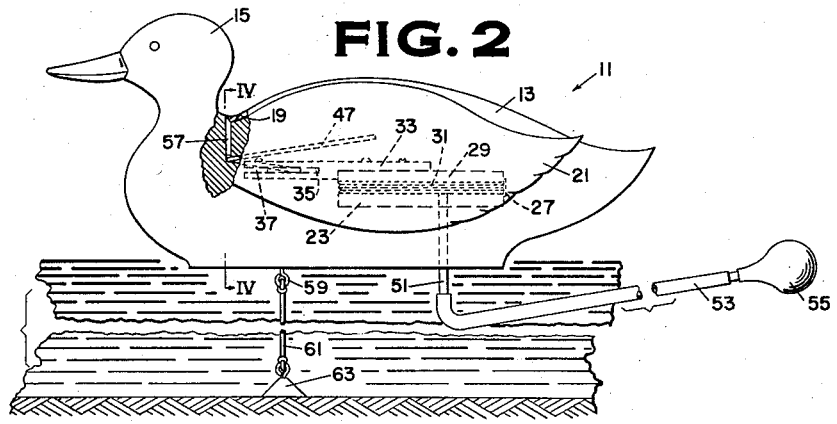
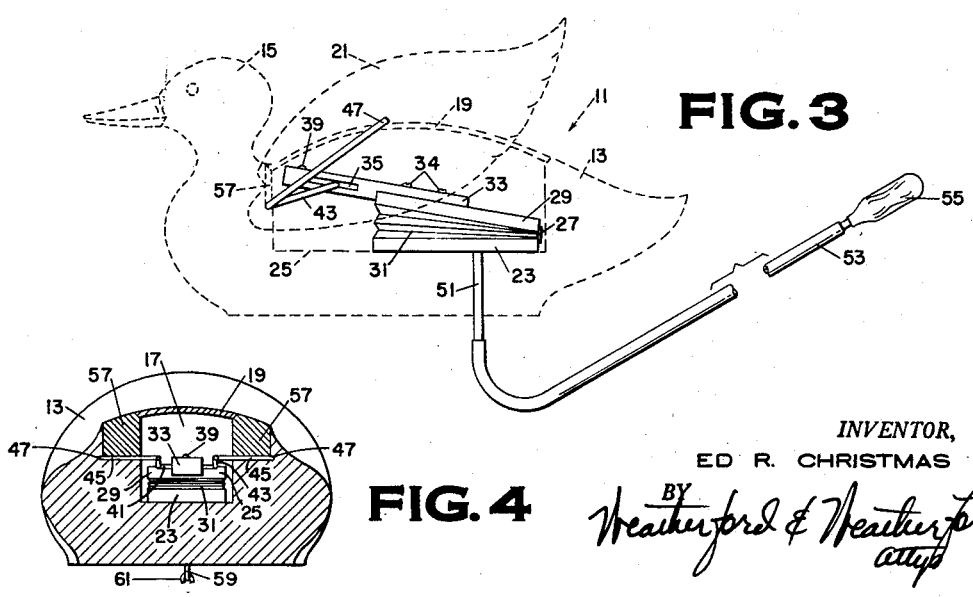
INVENTOR,
ED R. CHRISTMAS

United States Patent Office 2,909,859
Patented Oct. 27, 1959

2,909,859

DECOY DEVICE

Ed R. Christmas, Memphis, Tenn., assignor of one-half to Vernon R. York, Memphis, Tenn.

Application January 23, 1959, Serial No. 788,616

4 Claims. (Cl. 43—3)

This invention relates to certain new and useful improvements in decoy devices, and particularly relates to a new and novel arrangement for simulating the animation of a decoy such as is highly desirable in connection with duck, goose and other type of hunting.

It has long been recognized by hunters, and particularly duck and goose hunters, that decoys are highly desirable for attracting the game birds into shooting range. The attractiveness of decoys has sought to be enhanced by making the decoys as nearly as possible like live ducks, geese or other fowl, and many efforts have been expended in the ornamentation and configuration of such decoy devices in order more closely to simulate the appearance and actions of a live bird.

It has been recognized that movements of such decoys simulating the movements of a live bird add to the attractiveness of the decoy for the desired result, and to this end many efforts have been made to provide means for causing such decoys to move in their positions, and additionally many efforts have been heretofore made to provide a means for satisfactorily moving the wings of such a decoy, all for the purpose of simulating the action of a live bird.

The present invention is primarily directed to a new, novel and highly efficient means for effecting wing flapping on a decoy, it having been found that such wing movement more effectively provides an attracting simulation of a live bird and is more effective in producing the result of attracting the game birds into shooting range. Previous efforts to provide for the flapping or movement of wing elements of the decoy have required relatively cumbersome and involved mechanisms and devices and have in use largely proved commercially ineffective to accomplish the desired purpose.

The principal object of the present invention is to provide a decoy device with a new, novel and efficient means for effecting flapping of wing elements relative thereto.

A further object of the invention is to provide such a device in which wing elements are connected externally of the decoy body to wing levers which are operatively connected with a bellows device actuatable by a simple air pump located at a convenient location such as in a hunter's blind.

A further object of the invention is to provide a new and novel wing operating mechanism for decoy devices; and A further object of the invention is to generally improve the design, construction and efficiency of decoy devices.

The means by which the foregoing and other objects of the present invention are accomplished and the manner of their accomplishment will be readily understood from the following specification upon reference to the accompanying drawing, in which:

Fig. 1 is a top plan view of a decoy device with the operating mechanism of the present invention in position but prior to completion of mounting and installation.

Fig. 2 is a side elevational view of the decoy device of Fig. 1 after completion, with the operating mechanism being shown in dotted lines, and with parts being broken away for purposes of illustration.

Fig. 3 is a side elevational view of the operating mechanism of the device, with the decoy being shown in dotted lines, and with the operating mechanism being shown in wing elevating position; and Fig. 4 is a cross sectional view taken as on the line IV—IV of Figs. 1 and 2.

Referring now to the drawings in which the various parts are indicated by numerals, the present invention is shown as embodied in a decoy 11 having a buoyant body 13 which may be formed of buoyant material such as wood or other desired buoyant material, or may be inherently buoyant from air chambers. The body 13 is generally externally shaped to the formation of the body of a bird, such as a duck, here illustrated, or a goose or other desired shape for decoy purposes, and is provided with a head 15 for completing the simulation of the appearance of the type of bird desired.

Internally body 13 is hollow, which may be provided by a hollowed out chamber 17. The hollow interior or chamber is provided to house the wing operating mechanism of the present invention, and, upon installation of the wing operating mechanism, may be closed by a back plate 19, back plate 19 when mounted upon the body 13 being fixed thereto as by a suitable adhesive or other desired means. Housed within chamber 17 is the operating mechanism for effecting flapping of the wings 21. This mechanism comprises a bellows assembly having a lower block 23 rigidly mounted upon the base or bottom 25 of chamber 17. Bellows block 23 is hingedly connected as at 27 to an upper bellows block 29, the blocks 23, 29 being otherwise interconnected around the remainder of their respective peripheries by an accordion pleated expandable bellows cloth 31. A forwardly extending link 33 is rigidly fixed to the upper surface of bellows block 29 as by screws 34 and extends forwardly therefrom toward the head of decoy body 13.

Forwardly of bellows block 29, link 33 is provided with an elongated slot 35 for the purposes hereinafter to be mentioned. Preferably link 33 may be formed of a relatively narrow wooden member, and the slot 35 may be formed therein by a suitable sawing or other slotting operation. After the completion of the assembly of the bellows together with the other wing operating mechanism, the forward end of slot 35 may be effectively closed as by a plug 37 which may be suitably fixed in position as for example by the utilization of a screw such as the screw 39.

Operatively connected to link 33 is a double bell crank assembly adapted for the operation of the wings 21. This bell crank assembly includes a cross bar 41 adapted for mounting in slot 35. Perpendicularly connected to the opposite ends of cross bar 41 are the rear ends of crank arms 43, which arms at their forward ends are connected respectively to the inner ends of pivot bars 45. At their outer ends the respective pivot bars 45 are connected to the forward ends of wing levers 47.

Preferably the bell crank assembly, comprising bar 41, arms 43, bars 45 and levers 47, is an integrally formed unit which may be formed of a suitable wirelike length bent into the desired conformation. As can readily be seen, while wing levers 47 are connected perpendicularly to pivot bars 45, levers 47 are disposed in a plane diverging from the plane in which arms 43 are disposed.

Preferably the material of body 13 is substantially vertically slotted as at 49, on the opposite sides of chamber 17 and a minor distance forwardly thereof. Slots 49 extend downwardly into the body material to a point which is approximately at the level of the upper surface of link 33 when in normal at rest position such as is shown in Fig. 2.

In the assembly of the decoy device, together with the operating mechanism, the bellows, formed of blocks 23, 29, and cloth 31, is introduced into chamber 17, and lower block 23 is rigidly fixed to the base 25. The base 25 together with the lower portion of the body 13 and lower bellows block 23 are suitably apertured in register, and a hollow tubular fitting 51, preferably in the form of a copper tube, is connected thereto so as to afford communication from below the decoy body 13 into the interior of the bellows assembly. A suitable flexible pipe or line 53 may then be connected to the lower end of hollow fitting 51 and the flexible pipe 53 may be provided with a convenient air pump such as the bulb 55.

Either before the introduction of the bellows assembly into the chamber 17, or thereafter, link 33 may be rigidly connected as by screws 34 to upper bellows block 29, thus disposing the bellows and the connecting link in mounted position within hollow chamber 17. With the bellows thus mounted in position pivot bars 45 may be introduced into slots 49, respectively, and cross bar 41 introduced into link slot 35. It will be seen that when cross bar 41 is introduced into link slot 35 it is both slidably and turnably connected with the link, thus providing a lost-motion connection between link 33 and the bell crank assembly. When the cross bar 41 has thus been positioned in link slot 35, plug 37 may be introduced and fixed into position in order to block the separation of the cross bar from link 33.

The assembly of the cross bar to link 33 having been completed, it will be observed that the bell crank arms 43 lie outwardly from the respective sides of link 33. Pivot bars 45 may then be lowered to the bottom of the respective slots 49, and suitable fillers 57 may be introduced thereinto in order to prevent the upward movement of the pivot bars 45 while permitting their pivotal turning within the lower extremity of the slots 49.

If desired, as is true in most instances, decoy body 13 may be provided with a suitable anchor eye 59 to which may be fixed an anchor line 61 carrying at its lower end a suitable anchor 63.

It thus will be seen, as best shown in Figs. 1 and 2, that when thus assembled the bellows assembly comprising blocks 23, 29 and cloth 31 in at rest position are disposed with the blocks substantially horizontal and link 33 connected to the upper block 29 projects forwardly from the bellows assembly in substantially horizontal position. The crank arms 43 are disposed to incline upwardly forwardly from link 33, and the wing levers 47 are disposed to incline rearwardly upwardly from the pivot bars 45. It will further be seen that when so assembled the wing levers 47 are disposed to extend respectively outwardly beyond the opposite sides of decoy body 13.

When so positioned back plate 19 may be positioned to overlie the chamber 17 and to effect closure thereof, being fixed in position to body 13 by suitable adhesive or otherwise as previously mentioned.

After so positioning the bellows and crack assembly, the respective wings 21 may then be fixed to the wing levers 47, being then disposed in the position best shown in Fig. 2 when in the at rest position.

In order to effect operation of the device the air pump 55 may be actuated, communicating air under pressure to the interior of the bellows assembly through tube 53 and fitting 51, effecting an elevation of the upper bellows block 29 about the hinge 27, raising with the bellows block the link 33 and effecting thereby movement of the bell crank assembly through the interengagement of the cross bar 41 with the slot 35. As the bell crank assembly is thus moved upwardly it swings about the center of pivot bars 45 fixed in the lower extremities of the respective slots 49, the bars pivoting therein, and wings 21 affixed to the wing levers 47 are moved upwardly. When the pressure is released from the air pump 55 the wings are lowered and this action may be rapidly repeated, thus effecting a simulation of a wing flapping on the decoy device.

I claim:

1. In a decoy device which comprises a buoyant body externally simulating the appearance of a bird and having a hollow interior, a pair of wings, a wing operating mechanism associated with said body and connecting said wings to the exterior of said body for flapping movement to and from elevated position; said operating mechanism comprising a bellows, air pump means actuatably connected to said bellows, said bellows including upper and lower blocks hingedly connected at their rear ends and a bellows cloth connecting said blocks air-tightly together, a link mounted to and projecting forwardly from said upper bellows block, an elongated slot in the forward portion of said link; a crank assembly including a cross bar turnably and slidably mounted in said slot, transverse pivot bar means pivotally mounted in said body, arm means connecting said cross bar to the inner ends of said pivot bar means, and wing levers connected to the outer ends of said pivot bar means and respectively disposed exterior the opposite sides of said body, said wings being respectively fixed to said levers for movement therewith; said cross bar, said arms, said pivot bars, and said wing levers unitarily comprising said crank assembly, said wing levers diverging rearwardly upwardly from the plane of said arm means, whereby, upon activation and deactivation of said bellows by said pump means, the forward portion of said link is swung arcuately upwardly and downwardly effecting operation of said crank assembly and flapping movement of said wings.

2. In a decoy device which comprises a buoyant body externally simulating the appearance of a bird and having a hollow interior, a pair of wings, a wing operating mechanism associated with said body and connecting said wings to the exterior of said body for flapping movement to and from elevated position; said operating mechanism comprising a bellows, air pump means actuatably connected to said bellows, said bellows including upper and lower blocks and a bellows cloth connecting said blocks air-tightly together, a link mounted to and projecting forwardly from said upper bellows block, an elongated slot in the forward portion of said link; a crank assembly including a cross bar turnably and slidably mounted in said slot, transverse pivot bar means pivotally mounted in said body, arm means connecting said cross bar to the inner ends of said pivot bar means, and wing levers connected to the outer ends of said pivot bar means and respectively disposed exterior the opposite sides of said body, said wings being respectively fixed to said levers for movement therewith; said cross bar, said arms, said pivot bar means, and said wing levers unitarily comprising said crank assembly, said wing levers diverging rearwardly upwardly from the plane of said arm means, whereby, upon activation and deactivation of said bellows by said pump means, the forward portion of said link is swung upwardly and downwardly effecting operation of said crank assembly and flapping movement of said wings.

3. In a decoy device which comprises a buoyant body externally simulating the appearance of a bird and having a hollow interior, a pair of wings, a wing operating mechanism associated with said body and connecting said wings to the exterior of said body for flapping movement to and from elevated position; said operating mechanism comprising a bellows, air pump means actuatably connected to said bellows, said bellows including upper and lower blocks hingedly connected at their rear ends and a bellows cloth connecting said blocks air-tightly together, a link mounted to and projecting forwardly from said upper bellows block; a crank assembly connected to said link, and wing levers connected to and forming part of said crank assembly and disposed exterior the opposite sides of said body, said wings being respectively fixed to said levers for movement therewith; whereby, upon activation and deactivation of said bellows by said pump means, the forward portion of said link is swung arcuately upwardly and downwardly effecting operation of said crank assembly and flapping movement of said wings.

4. In a decoy device which comprises a buoyant body externally simulating the appearance of a bird and having a hollow interior, a pair of wings, a wing operating mechanism associated with said body and connecting said wings to the exterior of said body for flapping movement to and from elevated position; said operating mechanism comprising a bellows, air pump means actuatably connected to said bellows, said bellows including upper and lower blocks and a bellows cloth connecting said blocks air-tightly together, a link mounted to and projecting forwardly from said upper bellows block; a crank assembly connected to said link, and wing levers connected to and forming part of said crank assembly respectively disposed exterior the opposite sides of said body, said wings being respectively fixed to said levers for movement therewith; whereby, upon activation and deactivation of said bellows by said pump means, said link is swung upwardly and downwardly effecting operation of said crank assembly and flapping movement of said wings.

References Cited in the file of this patent

UNITED STATES PATENTS 2,227,242   Boutin _____ Dec. 31, 1940